(12) United States Patent
Kim et al.

(10) Patent No.: US 12,056,281 B2
(45) Date of Patent: Aug. 6, 2024

(54) METHOD AND SYSTEM FOR PROVIDING ROUGHNESS HAPTIC SENSE OF VIRTUAL OBJECT BY USING SPACE-TIME ENCODING

(71) Applicant: EWHA UNIVERSITY—INDUSTRY COLLABORATION FOUNDATION, Seoul (KR)

(72) Inventors: Young Jun Kim, Seoul (KR); Yae Sol Kim, Seoul (KR); Uran Oh, Seoul (KR)

(73) Assignee: EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 0 days.

(21) Appl. No.: 18/017,408

(22) PCT Filed: Mar. 17, 2021

(86) PCT No.: PCT/KR2021/003269
§ 371 (c)(1),
(2) Date: Jan. 22, 2023

(87) PCT Pub. No.: WO2022/019433
PCT Pub. Date: Jan. 27, 2022

(65) Prior Publication Data
US 2023/0205318 A1    Jun. 29, 2023

(30) Foreign Application Priority Data
Jul. 22, 2020 (KR) .......................... 10-2020-0091008

(51) Int. Cl.
*G06F 3/01* (2006.01)
*G06F 3/041* (2006.01)

(52) U.S. Cl.
CPC .............. *G06F 3/016* (2013.01); *G06F 3/013* (2013.01); *G06F 3/0416* (2013.01)

(58) Field of Classification Search
CPC ........ G06F 3/0416; G06F 3/013; G06F 3/011; G06F 3/016; G06F 2203/014; G02B 27/01; G06T 19/00; G06Q 10/04
See application file for complete search history.

(56) References Cited

U.S. PATENT DOCUMENTS

| | | | |
|---|---|---|---|
| 6,281,651 B1 * | 8/2001 | Haanpaa | B25J 9/0057 434/45 |
| 6,396,232 B2 * | 5/2002 | Haanpaa | G06F 3/016 901/41 |

(Continued)

FOREIGN PATENT DOCUMENTS

| | | |
|---|---|---|
| JP | 2008209689 A | 9/2008 |
| KR | 20080029676 A | 4/2008 |

(Continued)

OTHER PUBLICATIONS

Yaesol Kim et al., "Encountered-type haptic display for large VR environment using per-plane reachability maps", computer animation & virtual worlds, vol. 26, No. 3-4, pp. 1-11, May 2, 2018 (cited in ISR & cited in OA and NOA issued in the corresponding KR patent application No. 10-2020-0091008).

(Continued)

*Primary Examiner* — Vinh T Lam
(74) *Attorney, Agent, or Firm* — Workman Nydegger

(57) ABSTRACT

A method and a system for providing a roughness haptic sense of a virtual object by using space-time encoding are provided. The method for providing a roughness haptic sense of a virtual object may comprise the steps of: displaying virtual objects to a user; tracking the position of the user's hand; predicting a virtual object, which is most likely to collide with the hand, among the virtual objects; and when (Continued)

the hand touches a haptic sense providing device, controlling the haptic sense providing device on the basis of the surface roughness of the predicted virtual object to feed back a roughness haptic sense to the user.

11 Claims, 12 Drawing Sheets

(56) References Cited

U.S. PATENT DOCUMENTS

| | | | | |
|---|---|---|---|---|
| 8,350,806 | B2* | 1/2013 | Nagasaka | G06F 3/016 600/595 |
| 9,367,136 | B2* | 6/2016 | Latta | G06F 3/017 |
| 9,690,382 | B1* | 6/2017 | Moussette | G06F 3/167 |
| 9,946,350 | B2* | 4/2018 | Gulrez | G06F 3/016 |
| 9,952,668 | B2* | 4/2018 | Han | G06T 19/006 |
| 10,296,086 | B2* | 5/2019 | Rimon | G02B 27/0172 |
| 10,437,335 | B2* | 10/2019 | Daniels | G06F 3/014 |
| 10,617,942 | B2* | 4/2020 | Holz | G06F 3/014 |
| 10,698,492 | B2* | 6/2020 | Daniels | G06F 1/1686 |
| 10,871,829 | B2* | 12/2020 | Domenikos | G06F 3/04886 |
| 11,221,669 | B2* | 1/2022 | White | G06N 20/10 |
| 11,287,888 | B2* | 3/2022 | Nakamura | G06T 19/006 |
| 11,325,029 | B2* | 5/2022 | Nakamura | A63F 13/218 |
| 11,360,561 | B2* | 6/2022 | Richter | G06F 3/011 |
| 11,510,817 | B2* | 11/2022 | Baudisch | G06F 3/011 |
| 11,531,395 | B2* | 12/2022 | Kappus | G10K 11/34 |
| 11,537,208 | B2* | 12/2022 | Chen | G06V 40/28 |
| 11,550,395 | B2* | 1/2023 | Beattie | G06N 20/00 |
| 11,556,179 | B2* | 1/2023 | Ogita | G06F 3/014 |
| 11,592,902 | B2* | 2/2023 | Daniels | G06F 1/1686 |
| 11,614,793 | B2* | 3/2023 | O'Keefe | G06F 3/014 345/156 |
| 11,666,825 | B2* | 6/2023 | Delamont | G06T 19/006 463/32 |
| 11,743,623 | B2* | 8/2023 | Jackson | G06F 3/016 381/386 |
| 11,759,701 | B2* | 9/2023 | Bradley | G06T 7/73 463/31 |
| 11,819,883 | B2* | 11/2023 | Lee | G06F 3/011 |
| 11,823,558 | B2* | 11/2023 | Persson | G06F 3/0488 |
| 11,875,012 | B2* | 1/2024 | Benson | G06V 10/82 |
| 2017/0209737 | A1* | 7/2017 | Tadi | A63B 24/0062 |
| 2018/0164885 | A1* | 6/2018 | Cruz-Hernandez | G06F 3/0346 |
| 2018/0239418 | A1* | 8/2018 | Levesque | G06F 3/011 |
| 2018/0308246 | A1* | 10/2018 | Jeon | G06T 7/40 |
| 2019/0025915 | A1* | 1/2019 | Tzompa Sosa | A63F 13/285 |
| 2019/0201784 | A1 | 7/2019 | Holz et al. | |
| 2019/0310712 | A1* | 10/2019 | Araújo | G02B 27/017 |
| 2020/0019245 | A1* | 1/2020 | Ganadas | G06F 3/016 |

FOREIGN PATENT DOCUMENTS

| | | |
|---|---|---|
| KR | 20120136719 A | 12/2012 |
| KR | 20140128244 A | 11/2014 |
| KR | 20170091613 A | 8/2017 |
| KR | 20170104386 A | 9/2017 |
| KR | 20190095776 A | 8/2019 |
| KR | 20190122569 A | 10/2019 |
| KR | 102068775 B1 | 1/2020 |

OTHER PUBLICATIONS

Yaesol Kim et al., "Encounter-type haptic texture display using a collaborative robot", Haptics with xR, p. 26, Aug. 30, 2019 (cited in ISR & cited in OA and NOA issued in the corresponding KR patent application No. 10-2020-0091008).

Yaesol Kim et al., "Synthesizing the Roughness of Textured Surfaces for an Encountered-Type Haptic Display Using Spatiotemporal Encoding", IEEE Transactions on Haptics, pp. 1-12, Jun. 24, 2020 (cited in ISR & Prior Publication of Invention).

* cited by examiner

<Case 1>

<Case 2>

<Case 1>

<Case 2>

<Case 3>

<Case 4>

<Case 1>

<Case 2>

<Case 3>

<Case 4>

<Case 5>

METHOD AND SYSTEM FOR PROVIDING ROUGHNESS HAPTIC SENSE OF VIRTUAL OBJECT BY USING SPACE-TIME ENCODING

TECHNICAL FIELD

The following description relates to a system and method for providing roughness of a virtual object, and more particularly, to a system and method for feeding back various roughness haptic senses to a user without replacing textures to be coupled an end effector.

BACKGROUND ART

Technologies for effectively providing a virtual reality experience are being developed.

A encountered-type haptic sense providing device may help the user to be immersed in virtual reality by providing the user with the haptic sense of a virtual object that comes into contact with the user in the virtual reality.

Currently, since there is a need to provide various haptic senses to the user according to the type of the virtual object, the conventional haptic sense providing device attaches one of a plurality of physical textures to the end effector of the haptic sense providing device according to the virtual object that the user touches, and when the virtual object that the user touches is changed, the texture attached to the end effector is also changed.

However, since the conventional haptic sense providing device requires a configuration for storing a plurality of textures and a configuration for replacing textures, there are issues of increasing volume, cost, and complexity.

Accordingly, there is a demand for a method of providing various haptic senses to a user without replacing the textures to be coupled to the end effector.

DISCLOSURE OF THE INVENTION

Technical Goals

The following description provides a system and method for feeding back various roughness haptic senses to a user without replacing textures to be coupled to an end effector by providing different roughness haptic senses according to direction and by rotating and moving the end effector in contact with the user's hand according to a spatial encoding result and a temporal encoding result.

Technical Solutions

A method of providing a roughness haptic sense of a virtual object according to an embodiment of the present disclosure may include displaying virtual objects to a user; tracking a position of the user's hand; predicting a virtual object, which is most likely to collide with the hand, among the virtual objects; and when the hand touches a haptic sense providing device, controlling the haptic sense providing device on the basis of a surface roughness of the predicted virtual object to feed back a roughness haptic sense to the user.

The feeding back of the roughness haptic sense of the method of providing the roughness haptic sense of the virtual object according to an embodiment of the present disclosure may include rotating or moving an end effector of the haptic sense providing device in contact with the hand according to the surface roughness of the predicted virtual object and a moving direction of the hand to perform haptic sense rendering for feeding back the roughness haptic sense.

For the end effector of the method of providing the roughness haptic sense of the virtual object according to an embodiment of the present disclosure, polygonal or elliptical shaped protrusions in which an X-axis radius is different from a radius of the other axis are formed, or a textured surface on which the protrusions are formed is attached, so that different roughness haptic senses are fed back to the user according to an angle at which the end effector is in contact with the hand.

The predicting of the virtual object of the method of providing the roughness haptic sense of the virtual object according to an embodiment of the present disclosure may include predicting a region of interest of the user based on a gaze direction of the user; and predicting a virtual object including the region of interest to be a virtual object most likely to collide with the hand.

The predicting of the virtual object of the method of providing the roughness haptic sense of the virtual object according to an embodiment of the present disclosure may further include predicting a position and time at which the hand collides with the predicted virtual object based on a position and moving velocity of the hand; and according to the predicted position and time, moving a position of the end effector that contacts the hand in the haptic sense providing device and feeds back the roughness haptic sense to the user.

A system for providing a roughness of a virtual object according to an embodiment of the present disclosure may include a HMD for displaying virtual objects to a user; a virtual object roughness providing device for tracking a position of the user's hand and predicting a virtual object, which is most likely to collide with the hand, among the virtual objects; and a haptic sense providing device for feeding back a roughness haptic sense to the user according to a surface roughness of the predicted virtual object when the hand touches the haptic sense providing device.

The virtual object roughness providing device of the system for providing the roughness of the virtual object according to an embodiment of the present disclosure may rotate or move an end effector of the haptic sense providing device in contact with the hand according to the surface roughness of the predicted virtual object and a moving direction of the hand to perform haptic sense rendering for feeding back the roughness haptic sense.

For the end effector of the system for providing the roughness of the virtual object according to an embodiment of the present disclosure, polygonal or elliptical shaped protrusions in which an X-axis radius is different from a radius of the other axis are formed, or a textured surface on which the protrusions are formed is attached, so that different roughness haptic senses are fed back to the user according to an angle at which the end effector is in contact with the hand.

The virtual object roughness providing device of the system for providing the roughness of the virtual object according to an embodiment of the present disclosure may predict a region of interest of the user based on a gaze direction of the user, and predict a virtual object including the region of interest to be a virtual object most likely to collide with the hand.

The virtual object roughness providing device of the system for providing the roughness of the virtual object according to an embodiment of the present disclosure may predict a position and time at which the hand collides with the predicted virtual object based on a position and moving velocity of the hand, and according to the predicted position and time, move a position of the end effector that contacts the hand in the haptic sense providing device and feed back the roughness haptic sense to the user.

The virtual object roughness providing device according to an embodiment of the present disclosure may include a visual rendering unit for displaying virtual objects to a user using a HMD; a user tracker for tracking a position of the user's hand; an object prediction unit for predicting a virtual object, which is most likely to collide with the hand, among the virtual objects; and a haptic sense rendering unit for controlling a haptic sense providing device according to a surface roughness of the predicted virtual object to feed back a roughness haptic sense to the user when the hand touches the haptic sense providing device.

The haptic sense rendering unit of the virtual object roughness providing device according to an embodiment of the present disclosure may rotate or move an end effector of the haptic sense providing device in contact with the hand according to the surface roughness of the predicted virtual object and a moving direction of the hand to perform haptic sense rendering for feeding back the roughness haptic sense.

The object prediction unit of the virtual object roughness providing device according to an embodiment of the present disclosure may predict a region of interest of the user based on a gaze direction of the user, and predict a virtual object including the region of interest to be a virtual object most likely to collide with the hand.

The object prediction unit of the virtual object roughness providing device according to an embodiment of the present disclosure may predict a position and time at which the hand collides with the predicted virtual object based on a position and moving velocity of the hand, and the haptic sense rendering unit may move a position of the end effector that contacts the hand in the haptic sense providing device and feed back the roughness haptic sense to the user according to the predicted position and time.

Effects

According to an embodiment of the present disclosure, various roughness haptic senses may be fed back to a user without replacing textures to be coupled to an end effector by providing different roughness haptic senses according to direction and by rotating and moving the end effector in contact with the user's hand according to a spatial encoding result and a temporal encoding result.

BEST MODE FOR CARRYING OUT THE INVENTION

Figure 1:
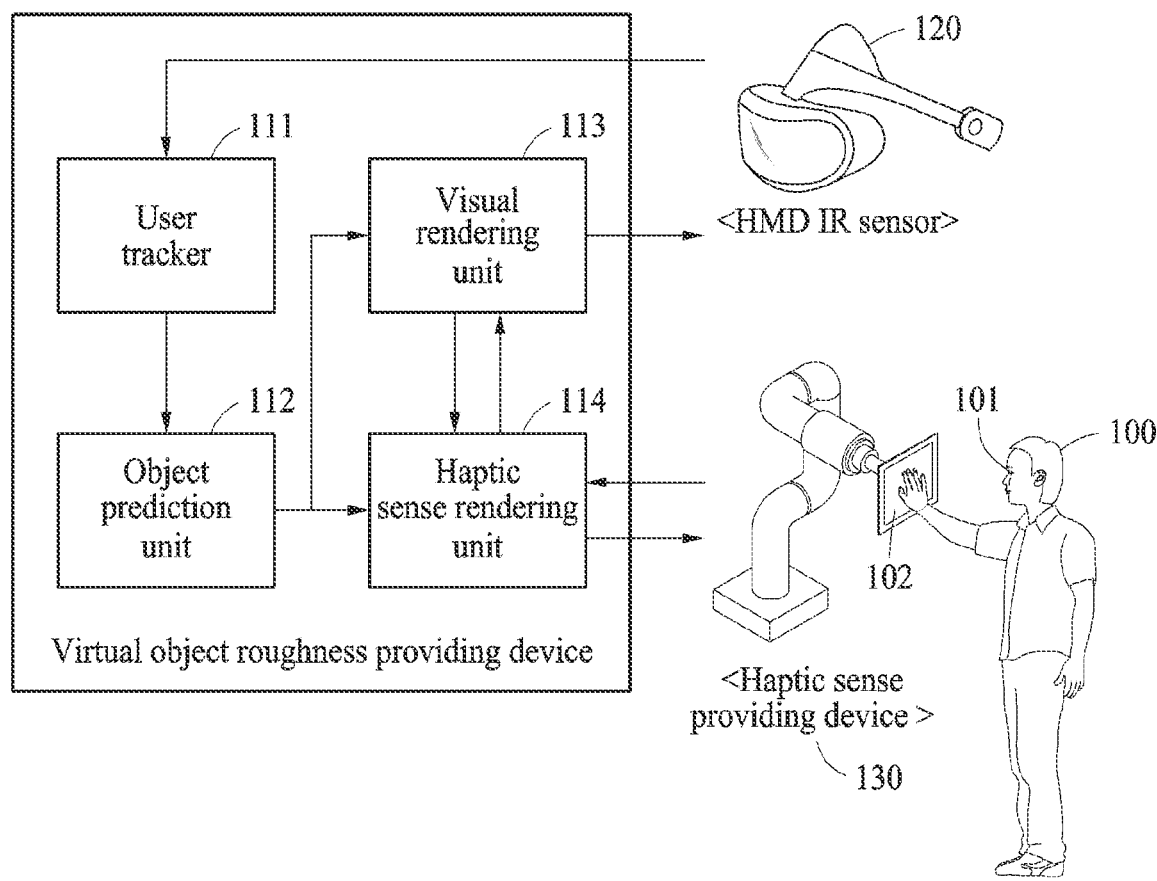
FIG. 1 is a diagram illustrating a system for providing a roughness of a virtual object according to an embodiment of the present disclosure.

Hereinafter, embodiments will be described in detail with reference to the accompanying drawings. However, various alterations and modifications may be made to the embodiments. Here, the embodiments are not meant to be limited by the descriptions of the present disclosure. The embodiments should be understood to include all changes, equivalents, and replacements within the idea and the technical scope of the present disclosure.

The terminology used herein is for the purpose of describing particular embodiments only and is not to be limiting of the embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

Hereinafter, embodiments will be described in detail with reference to the accompanying drawings.

FIG. 1 is a diagram illustrating a system for providing a roughness of a virtual object according to an embodiment of the present disclosure.

As illustrated in FIG. 1, a system for providing a roughness of a virtual object may include a virtual object roughness providing device 100, a HMD 120, and a haptic sense providing device 130.

The virtual object roughness providing device 100 may include a user tracker 111, an object prediction unit 112, a visual rendering unit 113, and a haptic sense rendering unit 114. Here, the user tracker 111, the object prediction unit 112, the visual rendering unit 113, and the haptic sense rendering unit 114 may be different processors, or separate modules included in a program executed by one processor.

The visual rendering unit 113 may render a virtual environment and a virtual object to be provided to a user 100 and transmit the virtual environment and virtual object to the HMD 120.

The HMD(Head Mounted Display) 120 may display a virtual object to the user 100 according to rendering information received from the visual rendering unit 113. Also, the HMD 120 may track a direction of the head of the user 100 using a tracker. In addition, the HMD 120 may determine a direction in which eyes 101 of the user 100 gaze according to a direction of the head of the user 100 and transmit to the user tracker 111.

The user tracker 111 may track a position of a hand 102 of the user 100 using an infrared ray (IR) sensor. For example, the IR sensor may be attached to the HMD 120 to track the position of the hand 120 of the user 100 wearing the HMD 120. In addition, the IR sensor may be installed in the haptic sense providing device 130 or within a certain distance from the haptic sense providing device 130 to track the position of the hand 102 of the user 100 extending in a direction towards where the haptic sense providing device 130 is located.

The object prediction unit 112 may predict a virtual object most likely to collide with the hand 102 among virtual objects displayed to the user 100 by the HMD 120.

Specifically, the object prediction unit 112 may predict a region of interest of the user 100 based on a gaze direction in which the eyes 101 of the user 100 gaze. Then, the object prediction unit 112 may predict the virtual object including the region of interest among the virtual objects rendered by the visual rendering unit 113 to be the virtual object most likely to collide with the hand 112 of the user 100. In addition, the object prediction unit 112 may predict a position and time at which the hand 102 collides with the predicted virtual object based on a position and moving velocity of the hand 102 tracked by the user tracker 111. In addition, the object prediction unit 112 may transmit identification information of the predicted virtual object and the position and time when the hand 102 collides with the predicted virtual object to the visual rendering unit 113 and the haptic sense rendering unit 114.

The haptic sense rendering unit 114 may move the position of an end effector that contacts the hand 102 in the haptic sense providing device 130 and feeds back a roughness haptic sense to the user 100 according to the position and time predicted by the object prediction unit 112. Also, the haptic sense rendering unit 114 may monitor whether the user's hand is in contact with the end effector of the haptic sense providing device 130.

Here, the haptic sense providing device 130 may include a torque sensor, and may measure a contact force f of the user 100 in contact with the end effector and transmit to the haptic sense rendering unit 114. In addition, when the received contact force f is greater than or equal to a preset threshold, the haptic sense rendering 114 may determine that the user's hand has contacted the end effector of the haptic sense providing device 130. For example, the threshold may be 3N.

When the hand 102 of the user 100 makes contact with the end effector of the haptic sense providing device 130, the haptic sense rendering unit 114 may control the haptic sense providing device 130 according to a surface roughness of the predicted virtual object and feed back the roughness haptic sense to the user. Here, the haptic sense rendering unit 114 may rotate or move the end effector of the haptic sense providing device 130 contacted by the hand 102 according to the surface roughness of the predicted virtual object and the moving direction of the hand 102 to perform haptic sense rendering for feed back. In addition, the end effector may have polygonal or elliptical shaped protrusions in which the radius of the X-axis is different from the radius of the other axis, or may be attached with a textured surface on which the protrusions are formed, so that different roughness haptic senses may be fed back to the user 100 according to the direction in which the end effector is in contact with the hand 102. Also, the visual rendering unit 113 may display the hand of the user 100 displayed in the virtual reality to be in contact with the predicted virtual object.

Specifically, the haptic sense rendering unit 114 may perform spatial encoding and temporal encoding according to the surface roughness of the predicted virtual object and the moving direction and velocity of the hand 102 of the user 100 stroking the corresponding virtual object. Also, the haptic sense rendering unit 114 may determine a rotation angle of the end effector according to a spatial encoding result, and rotate the end effector. In addition, the haptic sense rendering unit 114 may determine the moving direction and velocity of the end effector according to a temporal encoding result, and move the end effector in the determined direction.

The system for providing a roughness of a virtual object according to an embodiment may provide the user 100 with various roughness haptic senses by controlling the haptic sense providing device 130 according to spatial encoding and temporal encoding.

Figure 2:
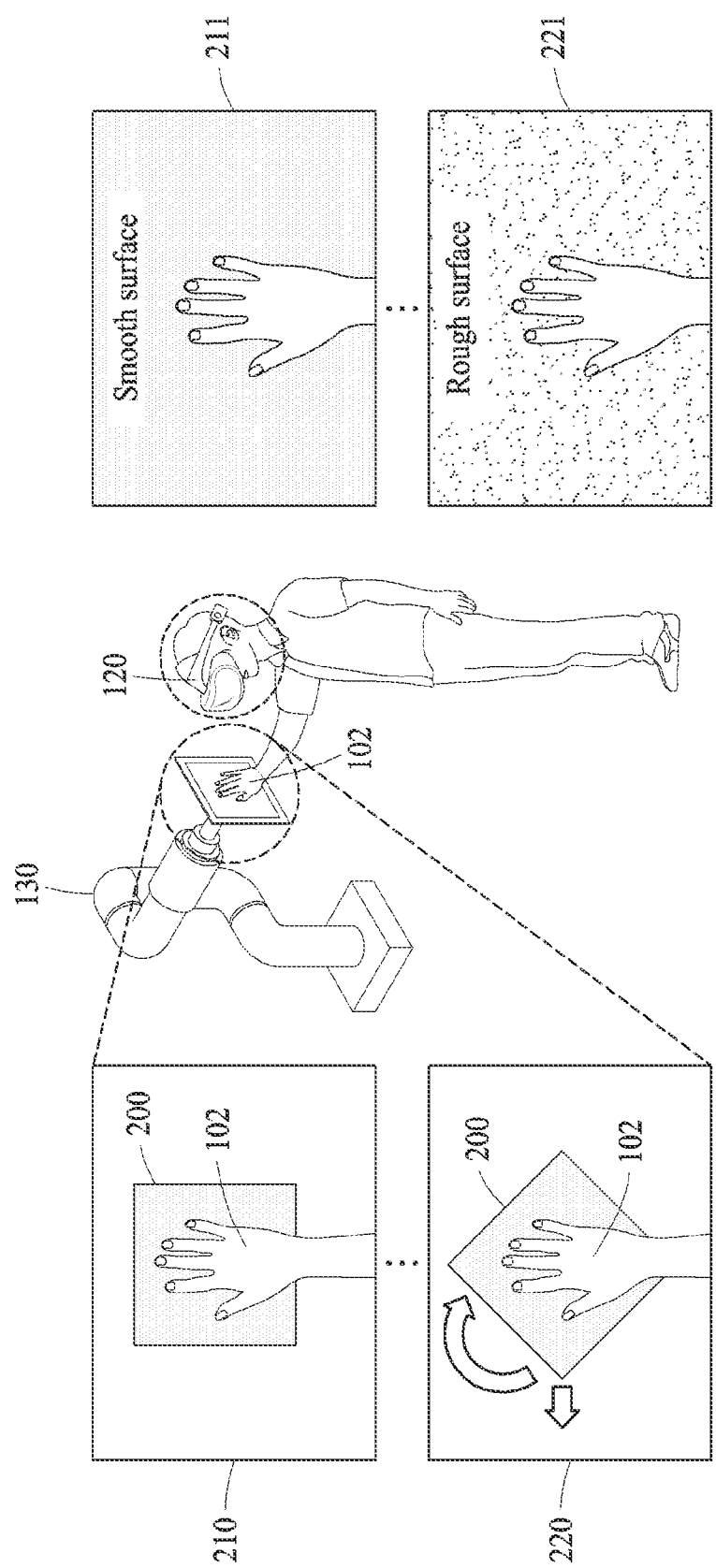
FIG. 2 is a diagram illustrating an operation of a system for providing a roughness of a virtual object according to an embodiment of the present disclosure.

FIG. 2 is a diagram illustrating an operation of a system for providing a roughness of a virtual object according to an embodiment of the present disclosure.

In an end effector 200 of the haptic sense providing device 130 of FIG. 2, polygonal or elliptical shaped protrusions having an X-axis radius longer than a Y-axis radius may be formed, or a textured surface on which the protrusions are formed may be attached.

Also, when a surface roughness of a virtual object contacted by the hand 102 of a user wearing the HMD 120 in a virtual environment is the lowest smooth surface 211, the haptic sense rendering unit 114 of the virtual object roughness providing device 100 may set an angle of the end effector 200 to "0" degrees 210 and maximize the texton width, thereby feeding back the lowest level of roughness haptic sense to the user 200.

In addition, when the surface roughness of a virtual object contacted by the hand 102 of the user wearing the HMD 120 in a virtual environment is a rough surface 221 higher than the smooth surface 211, the haptic sense rendering unit 114 of the virtual object roughness providing device 100 may set an angle of the end effector 200 to "90" degrees 220 and minimize the texton width, thereby increasing the roughness haptic sense level fed back to the user 200.

Figure 3:
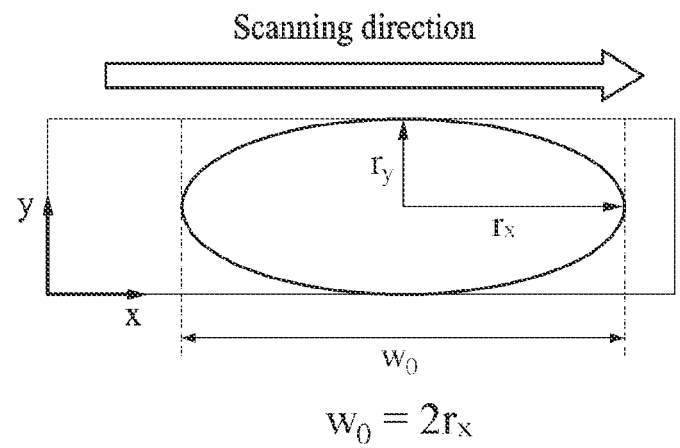
FIG. 3 illustrates an example of a perceptual width of haptic sense feedback provided to a user according to a scanning direction of the user in an end effector according to an embodiment of the present disclosure.
Figure 3:
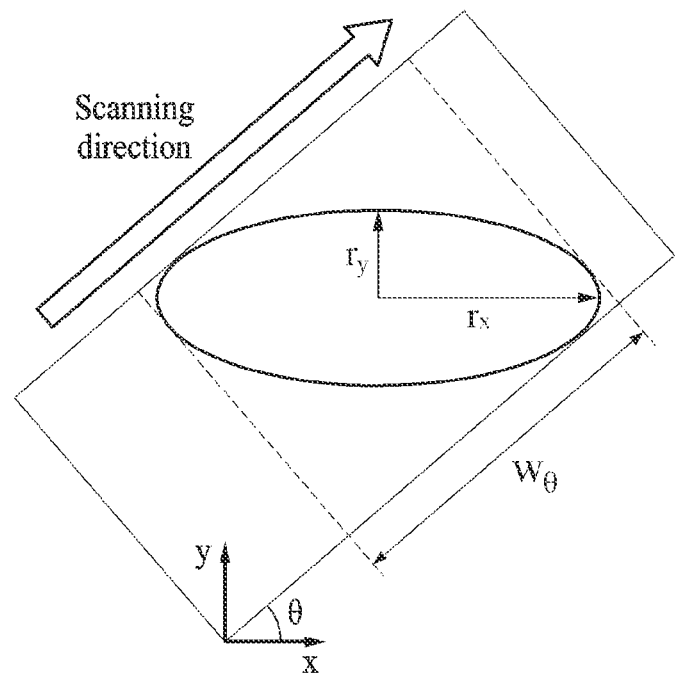

FIG. 3 illustrates an example of a perceptual width of haptic sense feedback provided to a user according to a scanning direction of the user in an end effector according to an embodiment of the present disclosure.

A roughness haptic sense of the end effector 200 recognized by the user 100 may be a function of spatial characteristics of the end effector 200 scanned along a scanning axis. Accordingly, a texton width may be defined according to a scanning direction.

For example, when a shape of a protrusion formed on the end effector 200 is a circle or a cone in which the X-axis radius and the Y-axis radius are the same, the user 100 may feel a constant perceptual width regardless of the scanning direction. Therefore, even if the direction of the end effector 200 is changed, different roughness haptic senses may not be fed back to the user 100.

On the other hand, the shape of the protrusions formed on the end effector 200 of the haptic sense providing device 130 may be an ellipse in which the X-axis radius ($r_x$) is longer than the Y-axis radius ($r_y$), as illustrated in FIG. 3. In addition, a scanning direction, which is a direction in which the hand 102 of the user 100 moves over the end effector 200 to stroke a virtual object, may be a direction moving from left to right.

Here, $W_\theta$, which is the texton width along the scanning direction, may be determined by considering the length of the texton projected in the scanning direction.

Here, $W_\theta$ may be a function in which an angle $\theta$ of the scanning direction satisfies condition $\theta \in |, \pi/2|$. Accordingly, when $0 < \theta <= (\pi/2)$, condition $W_\theta < W_0$ may be satisfied. Also, $W_\theta$ may be defined by Equation 1 below.

$$w_\theta = 2\sqrt{r_x^2 \cos^2\theta + r_y^2 \sin^2\theta}$$ [Equation 1]

As shown by Case 2 of FIG. 3, when the scanning direction is not parallel to the X-axis of the protrusion ($\theta \neq 0$), $W_\theta$ has a smaller value than $W_\theta$ when the scanning direction is parallel to the X-axis of the protrusion ($\theta = 0$), as shown by Case 1 of FIG. 3, and a higher level of roughness haptic sense may be fed back to the user 100.

Figure 4:
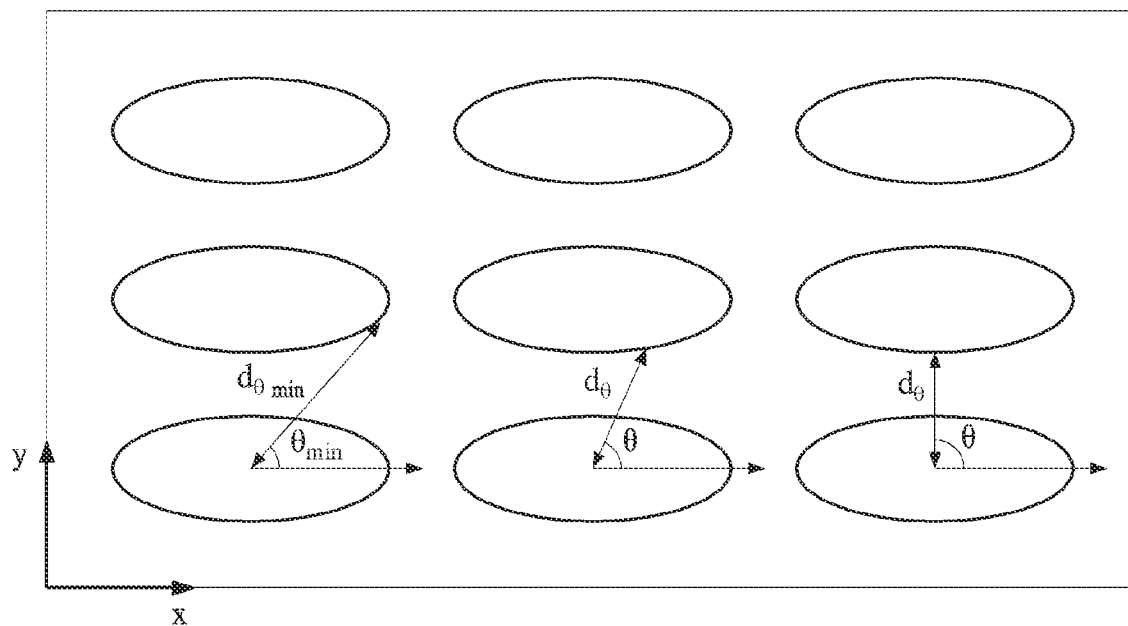
FIG. 4 illustrates an example of a change in distance between upper ends of protrusions included in an end effector according to an embodiment of the present disclosure.

FIG. 4 illustrates an example of a change in distance between protrusions included in an end effector according to an embodiment of the present disclosure.

According to psychophysics, a psychometric relationship between a distance between protrusions formed on the end effector 200 and a roughness haptic sense that the user 100 in contact with the end effector 200 receives as feedback may form an inverted U-shaped graph. For example, when the distance between the protrusions is greater than 3 mm, the distance between the protrusions decreases along the scan axis, so that the level of roughness haptic sense fed back to the user 100 may increase. Accordingly, the distance between the protrusions may be 3 mm or more by setting the radius ($r_y$) of the shorter Y-axis to 1.5 mm Here, the protrusions are formed on the end effector 200 so that a value of $d_\theta$, which is the distance between the protrusions, is inversely proportional to a value of $\theta$, so that the level of roughness haptic sense that the user 100 receives as feedback increases as $\theta$ increases.

For example, as illustrated in FIG. 4, the protrusions may be arranged in a rectangular lattice structure on the end effector 200. In this example, an interval do between the protrusions may be defined as a ray distance measured from the center of the protrusion to the nearest other protrusion along the scanning direction at an angle of $\theta \geq \theta_{min}$.

Figure 5:
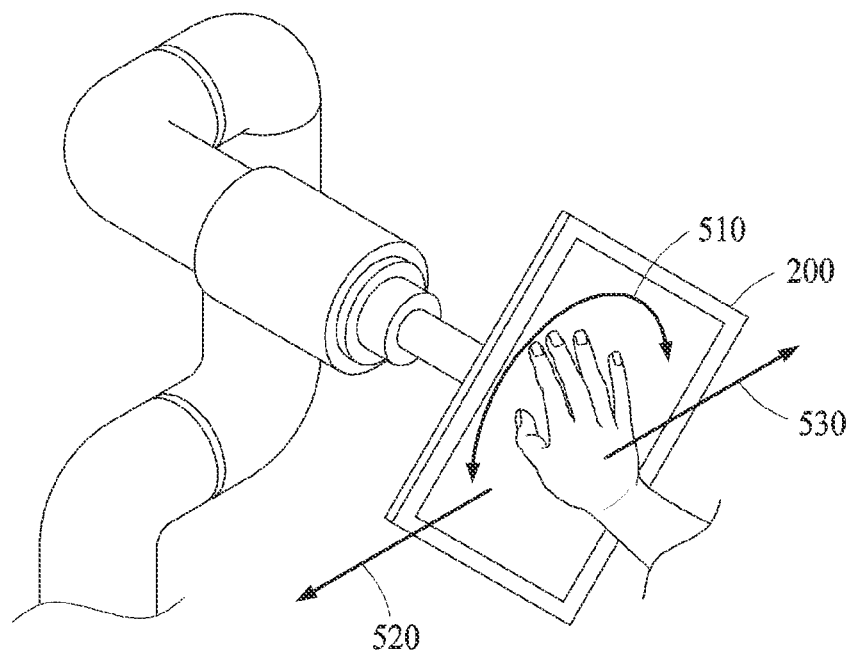
FIG. 5 illustrates an example of a haptic sense rendering process according to an embodiment of the present disclosure.

FIG. 5 illustrates an example of a haptic sense rendering process according to an embodiment of the present disclosure.

As illustrated in FIG. 5, the haptic sense providing device 130 may include a plurality of axial joints to move the end effector 200 so as to make contact with a user's hand according to the position of the user's hand. In addition, the haptic sense providing device 130 may include a component for rotating the direction of the end effector 200 and a torque sensor for measuring a contact force f of the user 100 in contact with the end effector 200. Also, the haptic sense providing device 130 may move the end effector 200 in contact with the hand of the user 100 in a preset direction and at a preset velocity.

The virtual object roughness providing device 100 may predict a virtual object most likely to collide with the user's hand by tracking a motion of the user's hand. In addition, the virtual object roughness providing device 100 may control the direction and moving velocity of the haptic sense providing device according to a surface roughness of the predicted virtual object to feed back a roughness haptic sense to the user.

For example, roughness information may be first sorted in ascending order for virtual textures of n virtual objects to be interacted with by the user. In this example, n pieces of distinguishable roughness information may be selected in ascending order from m encoded roughness information (assuming that m≥n) and mapped to the virtual object. Also, the roughness information may be mapped to the virtual object one-to-one, or a plurality of virtual objects may be mapped to one piece of roughness information, or different roughness information may be mapped to each area in one virtual object.

For example, a first bookshelf and a second bookshelf among the virtual objects may be mapped with the same roughness information. In addition, among the virtual objects, a chair may be mapped with different roughness information for an inner region of a backrest that contacts the user, a rear area of the backrest that does not contact the user, or an area under the chair.

Further, the roughness haptic sense fed back to the user by the haptic sense providing device 130 may be determined according to a scanning direction 530 of the user, a direction of the end effector 200, a moving direction 520 of the end effector 200, and a moving velocity of the end effector 200.

In addition, when a protrusion formed on the end effector 520 has an ellipse shape in which the X-axis radius ($r_x$) is longer than the Y-axis radius ($r_y$) as illustrated in FIG. 3, the haptic sense providing device 130 may change a texton width by rotating 510 the direction of the end effector 200 to change, thereby increasing or decreasing the level of roughness haptic sense fed back to the user 200.

Figure 6:
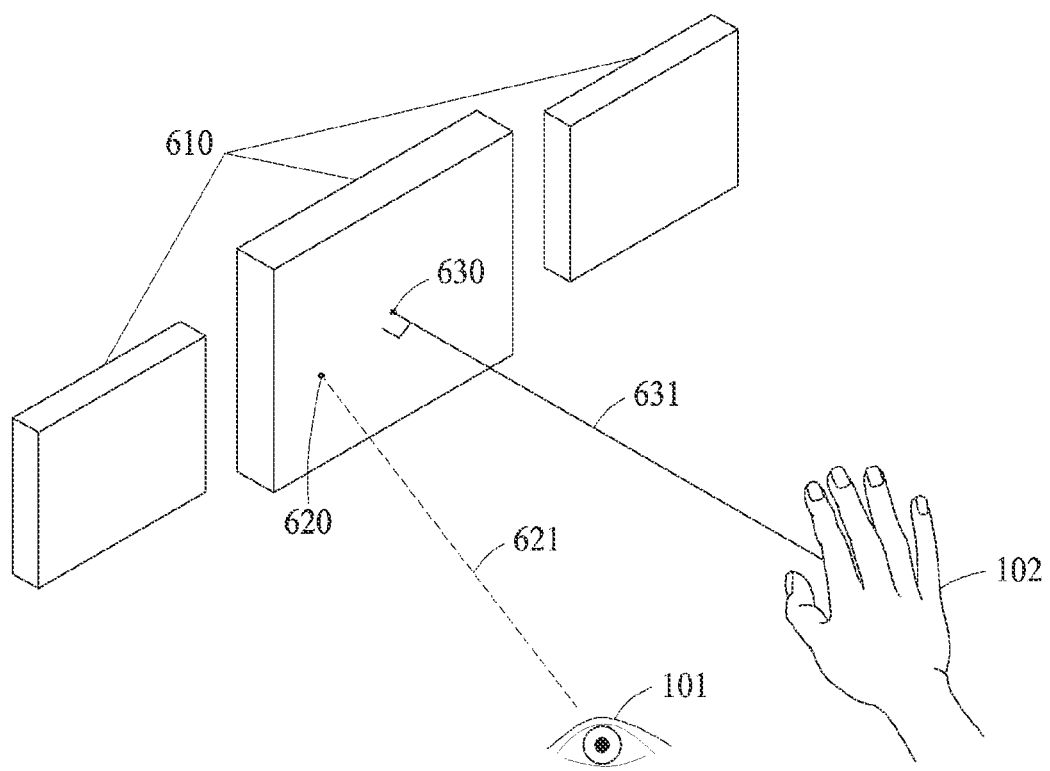
FIG. 6 illustrates an example of predicting a virtual object most likely to collide with a user's hand according to an embodiment of the present disclosure.

FIG. 6 illustrates an example of predicting a virtual object most likely to collide with a user's hand according to an embodiment of the present disclosure.

The user tracker 111 of the virtual object roughness providing device 100 tracks a user's head and hand in real time, and may be expressed in the same frame as the configuration of the haptic sense providing device 130. Here, a position of the user's head may be tracked by a HMD tracker and converted from a tracking sensor frame to a basic frame of the haptic sense providing device 130. In addition, a position and movement direction of the user's hand may be tracked by an IR motion sensor mounted on the HMD, and may be converted from a motion sensor frame to a basic frame of the haptic sense providing device 130.

For example, the user tracker 111 may reduce tracking noise and generate a smooth robot motion using a midpoint smoothing algorithm. In this example, the user tracker 111 may determine two positions after a second-stage midpoint smoothing is performed, by referring to four previous hand positions. In this example, the determined two positions may be position vectors (x, y, z) defined in a three-dimensional coordinate system, and may be values obtained by calculating the average of tracked hand position information in two stages. For example, when the four previous hand positions that are referenced are defined as p1, p2, p3, and p4 in chronological order, the user tracker 111 may determine three points $q1=(p1+p2)/2$, $q2=(p2+p3)/2$, $q3=(p3+p4)/2$ through a first-stage midpoint smoothing. Next, the user tracker 111 may determine two position vectors by applying the second-stage midpoint smoothing referring to q1, q2, and q3 in the same method.

Also, the user tracker 111 may calculate a direction vector according to the determined two positions and use the direction vector as an estimate of a scanning direction of the user.

The object prediction unit 112 may form a virtual line 621 according to the direction in which the user's eye 101 gazes, and an area in contact with the virtual line 621 among virtual objects 610 may be predicted as a region of interest 620 to the user.

Next, the object prediction unit 112 may predict a virtual object including the region of interest 620 to be a virtual object most likely to collide with the user's hand 102.

Next, the object prediction unit 112 may generate a virtual hand of the user according to a position tracked by the user tracker 111, and project 631 the generated virtual hand onto a surface 630 of the virtual object including the region of interest 620 to determine the position and direction in which the user's hand 102 contacts the virtual object.

Also, the haptic sense rendering unit 114 may control the haptic sense providing device 130 so that an end effector moves according to the position and direction in which the user's hand 102 contacts the virtual object determined by the object prediction unit 112.

Accordingly, the user's hand 102 may contact the end effector of the haptic sense providing device 130 at the position and direction in which the user's hand 102 contacts the virtual object determined by the object prediction unit 112.

Figure 7:
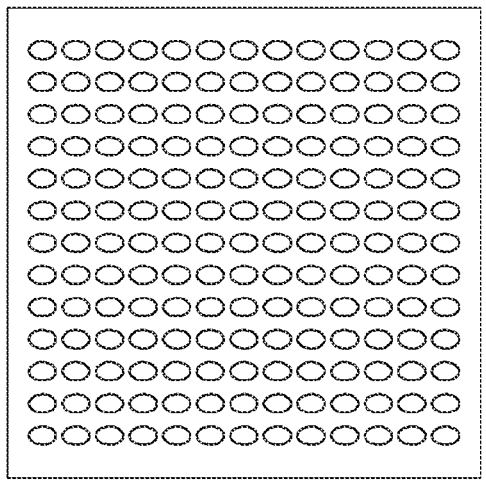
FIG. 7 illustrates an example of an end effector according to an embodiment of the present disclosure.
Figure 7:
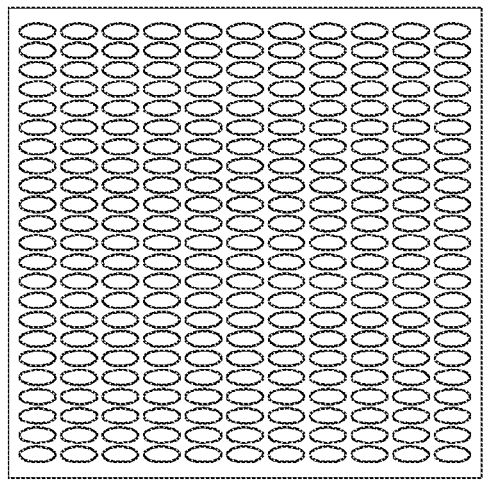
Figure 7:
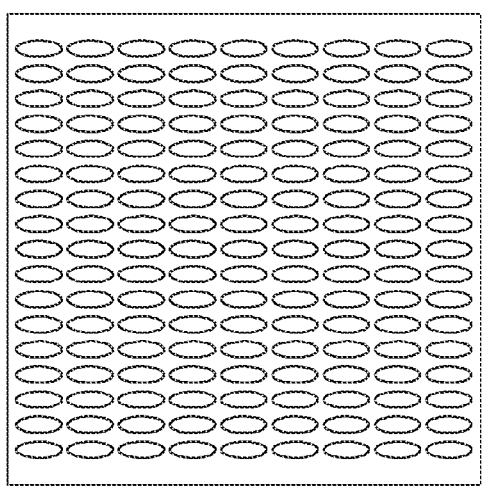
Figure 7:
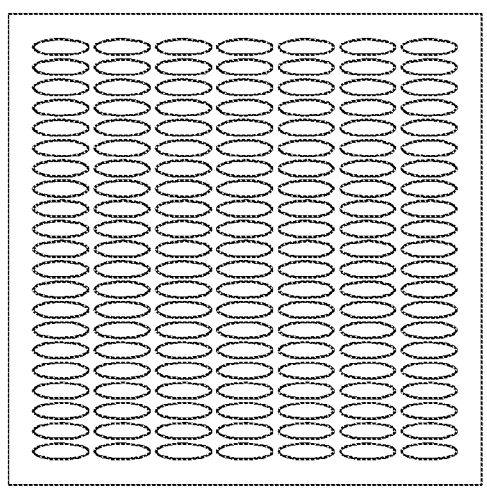

FIG. 7 illustrates an example of an end effector according to an embodiment of the present disclosure.

As illustrated in FIG. 7, an end effector may be formed by arranging protrusions having different shapes on a surface contacting a hand of a user according to embodiments. For example, in the embodiments of FIG. 7, the Y-axis radius ($r_y$) may all be 1.0 mm. Also, in Case 1 of FIG. 7, the X-axis radius ($r_x$) may be 1.5 mm, and in Case 2 of FIG. 7, the X-axis radius ($r_x$) may be 2.0 mm. Also, in Case 3 of FIG. 7, the X-axis radius ($r_x$) may be 2.5 mm, and in Case 4 of FIG. 7, the X-axis radius ($r_x$) may be 3.0 mm.

Figure 8:
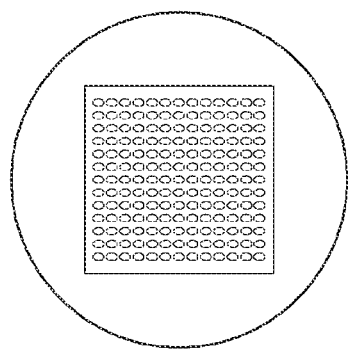
FIG. 8 illustrates an example of a rotation angle of an end effector that provides haptic sense feedback to a user according to an embodiment of the present disclosure.
Figure 8:
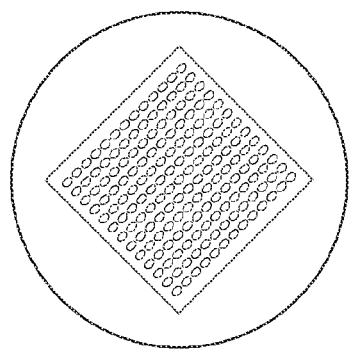
Figure 8:
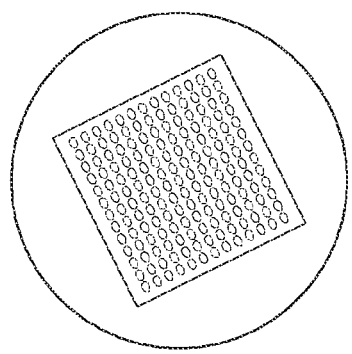
Figure 8:
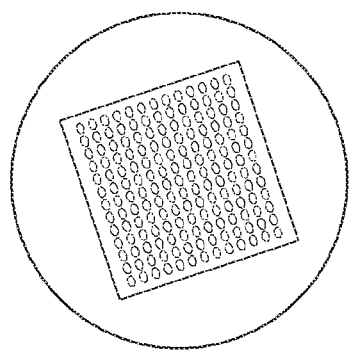
Figure 8:
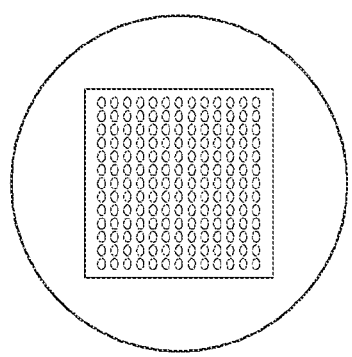

FIG. 8 illustrates an example of a rotation angle of an end effector that provides haptic sense feedback to a user according to an embodiment of the present disclosure. The end effector may be rotated at a predetermined angle according to a level of a roughness haptic sense that the haptic sense providing device 130 intends to provide to the user.

For example, as shown by Case 1 of FIG. 8, a rotation angle of the end effector may be $\theta=0$. Also, as shown by Case 2 of FIG. 8, the rotation angle of the end effector may be $\theta=45$. And, as shown by Case 3 of FIG. 8, the rotation angle of the end effector may be $\theta=63.43$. Also, as shown by Case 4 of FIG. 8, the rotation angle of the end effector may be $\theta=71.57$. And, as shown by Case 5 of FIG. 8, the rotation angle of the end effector may be $\theta=90$.

Figure 9:
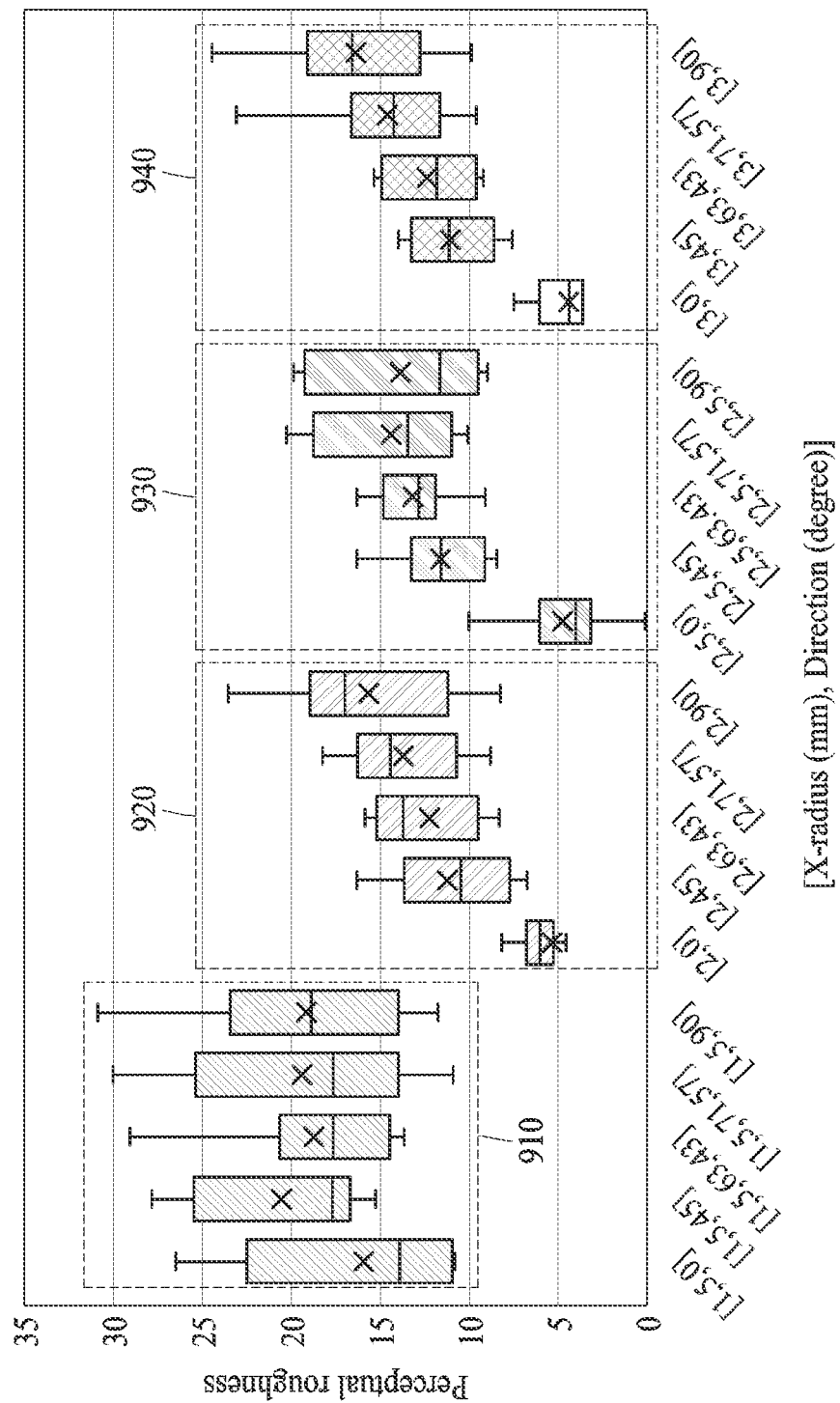
FIG. 9 illustrates an example of a level of a roughness haptic sense provided to a user for each rotational angle of an end effector according to an embodiment of the present disclosure.

FIG. 9 illustrates an example of a level of a roughness haptic sense provided to a user for each rotational angle of an end effector according to an embodiment of the present disclosure.

Specifically, FIG. 9 illustrates an example of roughness levels perceived by users when each of the end effectors illustrated in FIG. 8 is rotated at the angle shown in FIG. 8.

When the shape of the protrusions included in the end effector are as shown by Case 1 of FIG. 7 and a rotation angle $\theta$ of the end effector is changed to 0, 45, 63.43, 71.57, and 90, a roughness level 910 perceived by the user may not change much, as illustrated in FIG. 9.

However, a roughness level 920 perceived by the user when the shape of the protrusions included in the end effector is as shown by Case 2 of FIG. 7 and the rotation angle $\theta$ of the end effector is changed to 0, 45, 63.43, 71.57, and 90, a roughness level 930 perceived by the user when the shape of the protrusions included in the end effector is as shown by Case 3 of FIG. 7 and the rotation angle $\theta$ of the end effector is changed to 0, 45, 63.43, 71.57, and 90, and a roughness level 940 perceived by the user when the shape of the protrusions included in the end effector is as shown by Case 4 of FIG. 7 and the rotation angle $\theta$ of the end effector is changed to 0, 45, 63.43, 71.57, and 90, may change according to the angle as illustrated in FIG. 9.

That is, the haptic sense providing device 130 may control the rotational angle of the end effector in which protrusions having a Y-axis radius ($r_y$) different from the X-axis radius ($r_x$) of a predetermined size or a greater size are arranged, to feed back various levels of roughness haptic senses to the user.

Figure 10:
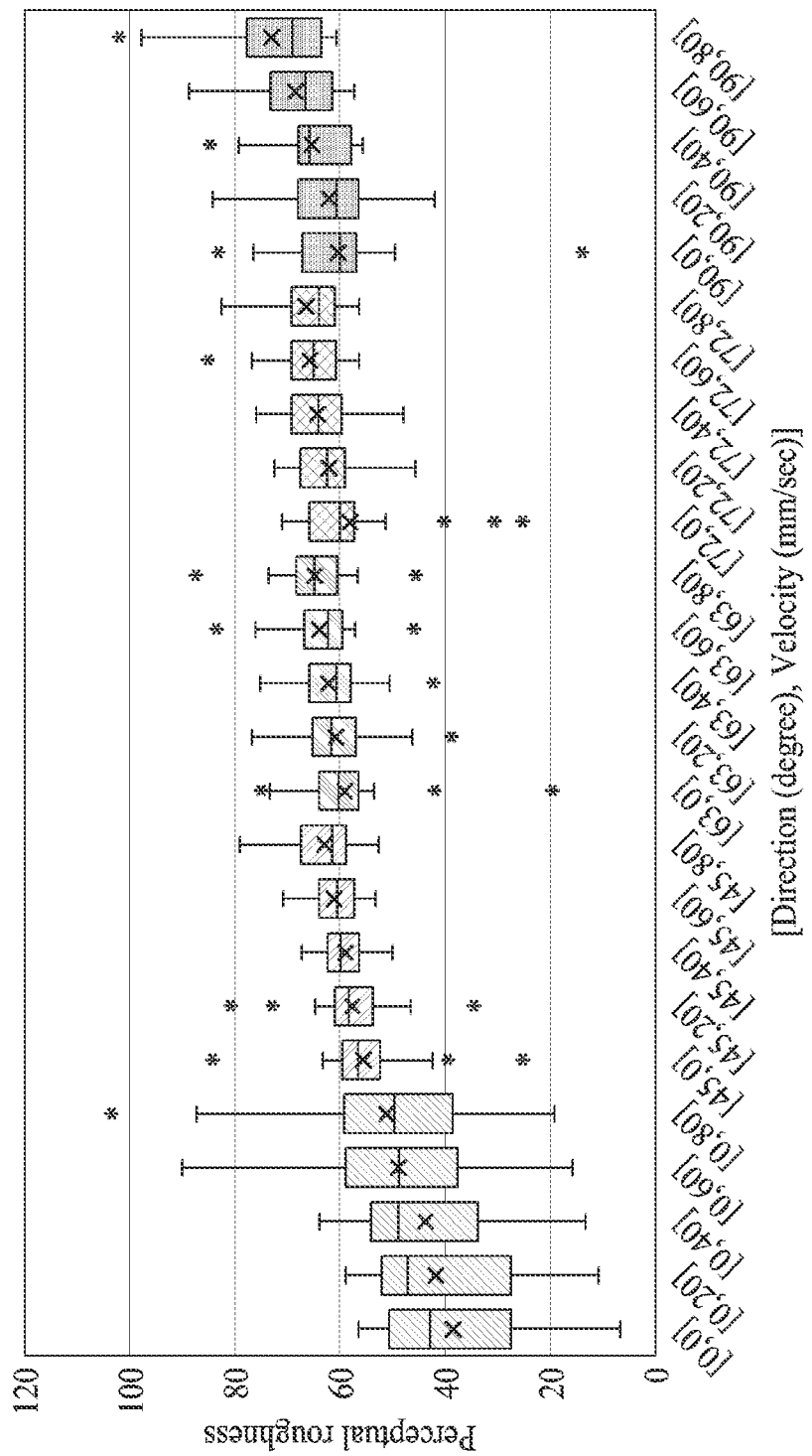
FIG. 10 illustrates an example of a result of haptic sense rendering according to an embodiment of the present disclosure.

FIG. 10 illustrates an example of a result of haptic sense rendering according to an embodiment of the present disclosure.

Specifically, FIG. 10 illustrates an example of levels of roughness haptic senses that are fed back to a user according to a combination of five different rotation angles of an end effector and five velocity values of the end effector 200.

The X-axis of FIG. 10 may represent a combination of rotation angles and velocity values of the end effector expressed by [rotation angle, velocity], and the Y-axis may represent a level of roughness haptic sense that is readjusted and normalized. That is, in FIG. 10, values having the same rotation angle are indicated by the same hatching.

According to FIG. 10, as the rotational angle and velocity value of the end effector increase, the level of the roughness haptic sense fed back to the user may increase.

Accordingly, the haptic sense providing device 130 may feed back roughness haptic senses of various levels to the user by controlling the rotation angle and the moving velocity of the end effector.

Figure 11:
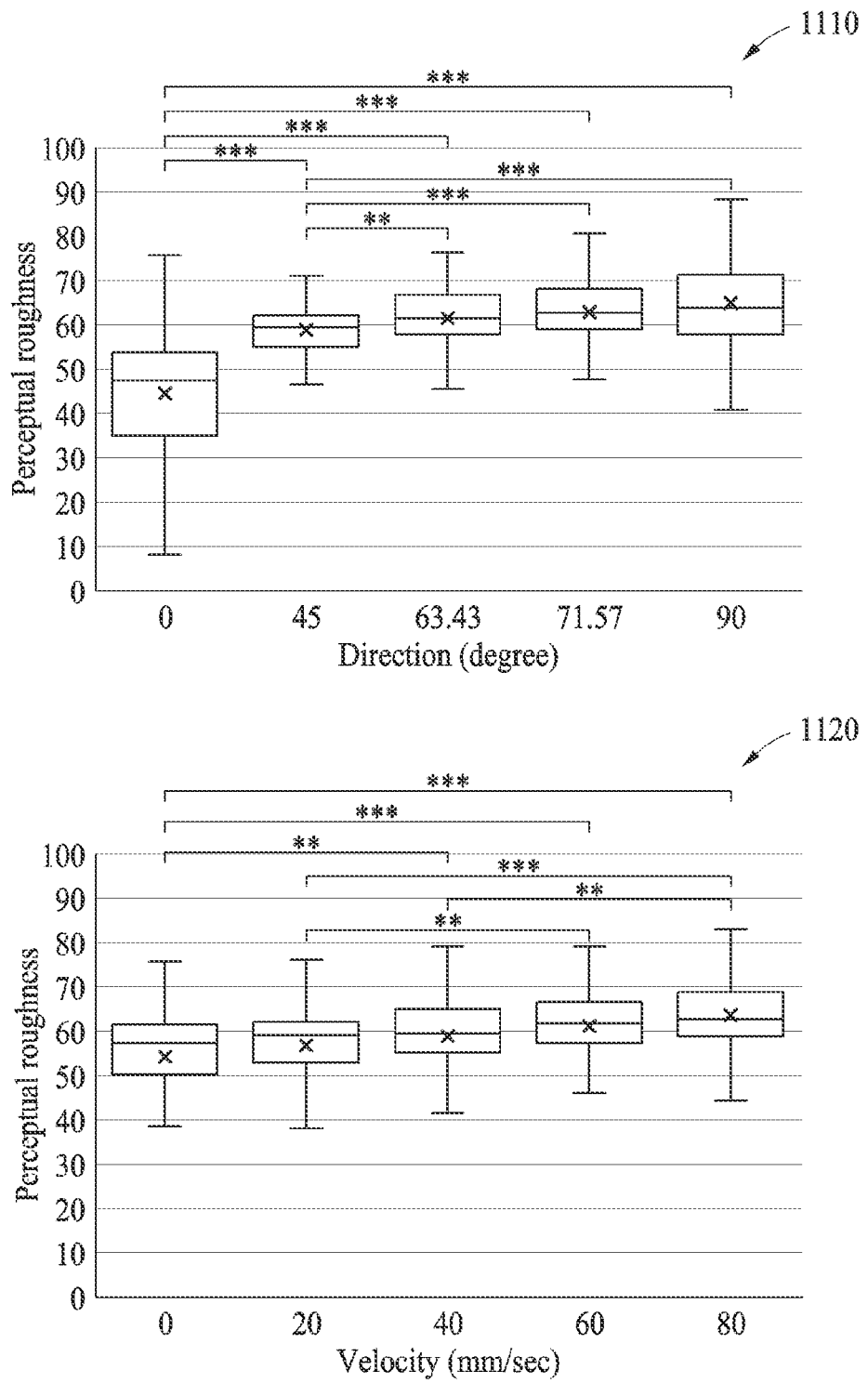
FIG. 11 illustrates an example of a level of a roughness haptic sense perceived by a user according to a direction and velocity of haptic sense rendering according to an embodiment of the present disclosure.

FIG. 11 illustrates an example of a level of a roughness haptic sense perceived by a user according to the direction and velocity of haptic sense rendering according to an embodiment of the present disclosure.

According to a graph 1110 representing a relationship between a rotation angle of an end effector and a level of a roughness haptic sense fed back to a user, the level of the roughness haptic sense fed back to the user may increase as the rotation angle increases.

However, compared to a difference between the level of the roughness haptic sense fed back to the user when the rotation angle is 0 degrees and the level of the roughness haptic sense fed back to the user when the rotation angle is 45 degrees, a difference between the levels of the roughness haptic senses fed back to the user when the rotation angle is 63.43 degrees, the rotation angle is 71.57 degrees, and the rotation angle is 90 degrees, may be small.

Also, according to a graph 1120 representing a relationship between a moving velocity of the end effector and the level of the roughness haptic sense fed back to the user, the level of the roughness haptic sense fed back to the user may increase as the moving velocity increases. In addition, as a difference in the moving velocity of the end effector increases, the difference in the level of the roughness haptic sense fed back to the user may also increase.

Figure 12:
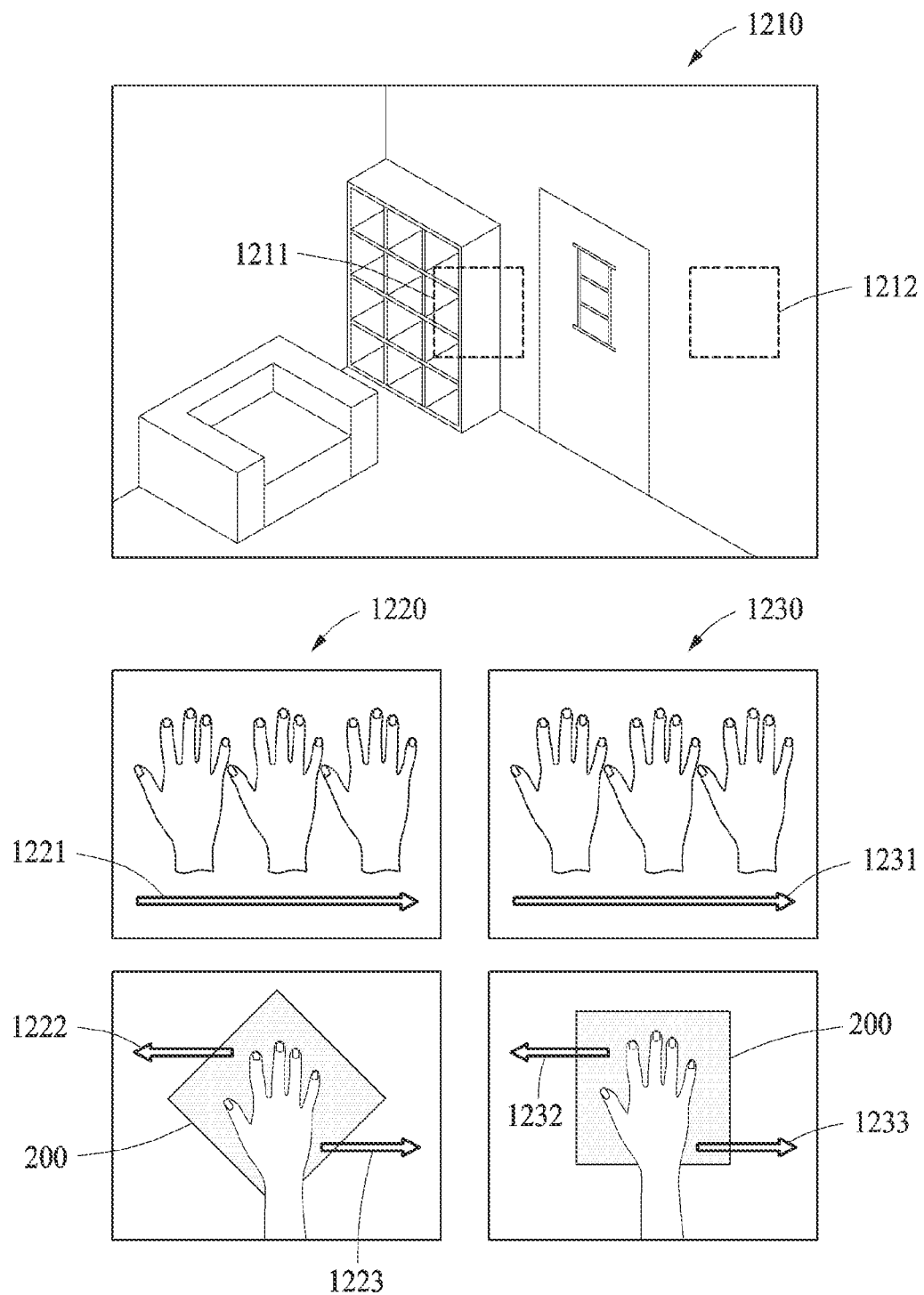
FIG. 12 illustrates an example of providing a roughness of a virtual object according to an embodiment of the present disclosure.

FIG. 12 illustrates an example of providing a roughness of a virtual object according to an embodiment of the present disclosure.

The HMD 120 may display a virtual environment 1210 including a bookshelf 1211 and wallpaper 1212 to the user 100 according to information received from the visual rendering unit 113 of the virtual object roughness providing device 100. Here, the bookshelf 1211 may be a virtual object having a rougher texture than the wallpaper 1212.

For example, while gazing at the bookshelf 1211 in the virtual environment 1210, the user 100 may perform 1220 a scanning operation 1221 of stroking a surface of the bookshelf 1211 from left to right with a hand. In this example, the virtual object roughness providing device 100 of the virtual object may control the haptic sense providing device 130 so that the end effector 200 moves to a position where it can contact the hand of the user 100. Also, the virtual object roughness providing device 100 of the virtual object may rotate the direction of the end effector 200 by 1 degree to 90 degrees according to a roughness of the bookshelf 1211 gazed at by the user 100, so that the level of roughness haptic sense fed back to the user by the end effector 200 may be increased.

Next, the virtual object roughness providing device 100 may move the end effector 200 in a direction 1222 opposite to a scanning direction in response to the user's hand moving in a scanning direction 1223 in the real world, so that a roughness haptic sense corresponding to the bookshelf 1221 may be fed back to the user. Here, the virtual object roughness providing device 100 of the virtual object may increase the moving velocity of the end effector 200 being moved in the direction 1222 opposite to the scanning direction, thereby further increasing the level of roughness haptic sense fed back to the user.

Next, while gazing at the wallpaper 1212 in the virtual environment 1210, the user 100 may perform 1230 a scanning operation 1231 of stroking a surface of the wallpaper 1212 from left to right with the user's hand. In this example, the virtual object roughness providing device 100 of the virtual object may control the haptic sense providing device 130 so that the end effector 200 moves to a position where it can contact the hand of the user 100. Also, the virtual object roughness providing device 100 of the virtual object may rotate the direction of the end effector 200 to a default angle of 0 degrees according to a roughness of the wallpaper 1212 gazed at by the user 100, so that the level of roughness haptic sense fed back to the user by the end effector 200 may be decreased.

Next, the virtual object roughness providing device 100 may move the end effector 200 in a direction 1232 opposite to a scanning direction in response to the user's hand moving in a scanning direction 1233 in the real world, so that a smooth haptic sense corresponding to the wallpaper 1221 may be fed back to the user. Here, the virtual object roughness providing device 100 of the virtual object may decrease the moving velocity of the end effector 200 being moved in the direction 1232 opposite to the scanning direction, thereby further decreasing the level of roughness haptic sense fed back to the user.

Figure 13:
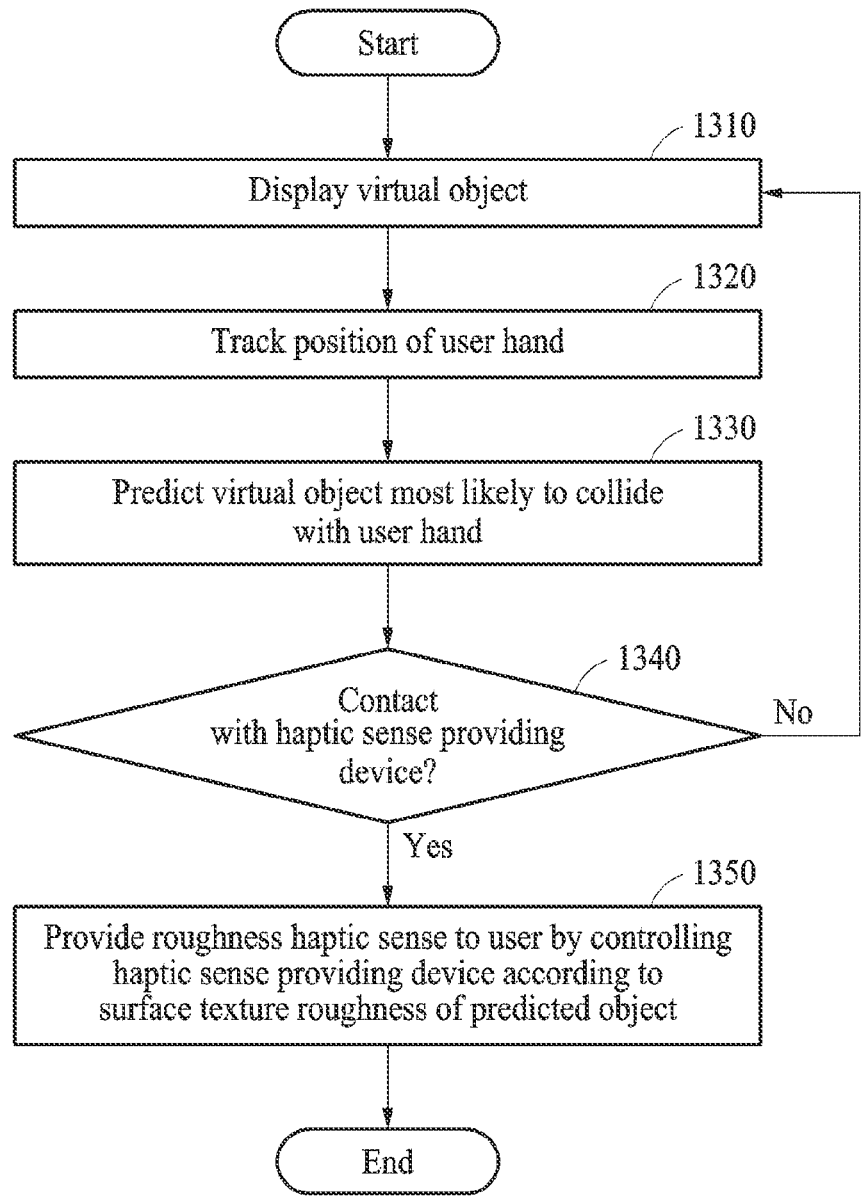
FIG. 13 is a flowchart illustrating a method of providing a roughness of a virtual object according to an embodiment of the present disclosure.

FIG. 13 is a flowchart illustrating a method of providing a roughness of a virtual object according to an embodiment of the present disclosure.

In operation 1310, the HMD 120 may display a plurality of virtual objects and a virtual environment including the virtual objects to the user 100 according to information received from the visual rendering unit 113 of the virtual object roughness providing device 100.

In operation 1320, the user tracker 112 of the virtual object roughness providing device 100 may track a position of the user's hand wearing the HMD 120 and a direction in which the eye 101 of the user 100 gazes.

In operation 1330, the object prediction unit 112 of the virtual object roughness providing device 100 may predict a virtual object most likely to collide with the hand of the user 100 from among the virtual objects displayed in operation 1310.

Here, the object prediction unit 112 may predict a region of interest of the user based on a gaze direction of the user, and predict a virtual object including the region of interest to be the virtual object most likely to collide with the hand. In addition, the object prediction unit 112 may predict a position and time at which the hand of the user 100 collides with the predicted virtual object based on the position and moving velocity of the hand of the user 100. Here, the haptic sense rendering unit 114 of the virtual object roughness providing device 100 may move the position of the end effector that contacts the hand 102 in the haptic sense providing device 130 and feeds back a roughness haptic sense to the user 100 according to the position and time predicted by the object prediction unit 112.

In operation 1340, the haptic sense rendering unit 114 may monitor whether the user's hand is in contact with the end effector of the haptic sense providing device 130. Here, the haptic sense providing device 130 may measure a contact force f of the user 100 in contact with the end effector using a torque sensor and transmit to the haptic sense rendering unit 114. In addition, when the received contact force f is greater than or equal to a preset threshold, the haptic sense rendering 114 may determine that the user's hand has contacted the end effector of the haptic sense providing device 130.

When it is determined that the user's hand is in contact with the end effector of the haptic sense providing device 130, the haptic sense rendering unit 114 may perform operation 1350. When it is determined that the user's hand is not in contact with the end effector of the haptic sense providing device 130, the haptic sense rendering unit 114 may transmit a request to perform operation 1320 to the user tracker 112.

In operation 1350, the haptic sense rendering unit 114 may control the haptic sense providing device 130 according to a surface roughness of the predicted virtual object to feed back a roughness haptic sense to the user. Here, the haptic sense rendering unit 114 may perform spatial encoding and temporal encoding according to the surface roughness of the predicted virtual object and the moving direction and velocity of the hand 102 of the user 100 stroking the corresponding virtual object. Also, the haptic sense rendering unit 114 may determine a rotation angle of the end effector according to a spatial encoding result and rotate the end effector. In addition, the haptic sense rendering unit 114 may determine the moving direction and velocity of the end effector according to a temporal encoding result, and move the end effector in the determined direction.

The present disclosure may provide feedback of various roughness haptic senses to a user without replacing textures to be coupled to an end effector by providing different roughness haptic senses according to direction and by rotating and moving the end effector in contact with the user's hand according to a spatial encoding result and a temporal encoding result.

Meanwhile, the virtual object roughness providing device or the method of providing the roughness of the virtual object according to the present disclosure may be written in a computer-executable program and may be implemented as various recording media such as magnetic storage media, optical reading media, or digital storage media.

Implementations of the various techniques described herein may be implemented in digital electronic circuitry, or in computer hardware, firmware, software, or in combinations thereof. The implementations may be achieved as a computer program product, for example, a computer program tangibly embodied in a machine readable storage device (a computer-readable medium) to process the operations of a data processing device, for example, a programmable processor, a computer, or a plurality of computers or to control the operations. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

While the present specification contains many specific implementation details, these should not be construed as limitations on the scope of any disclosure or of what may be claimed, but rather as descriptions of features that may be specific to particular embodiments of particular disclosures. Specific features described in the present specification in the context of individual embodiments may be combined and implemented in a single embodiment. On the contrary, various features described in the context of a single embodiment may be implemented in a plurality of embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned embodiments is required for all the embodiments, and it should be understood that the aforementioned program components and devices may be integrated into a single software product or packaged into multiple software products.

The embodiments disclosed in the present specification and the drawings are intended merely to present specific examples in order to promote understanding of the present disclosure, but are not intended to limit the scope of the present disclosure. It will be apparent to one of ordinary skill in the art that various modifications based on the technical spirit of the present disclosure, as well as the disclosed embodiments, can be made.

The invention claimed is:

1. A method of providing a roughness haptic sense of a virtual object, the method comprising:
    displaying virtual objects to a user;
    tracking a position of a hand of the user;
    predicting a virtual object most likely to collide with the hand among the virtual objects; and
    in response to the hand contacting a haptic sense providing device, controlling the haptic sense providing device according to a surface roughness of the predicted virtual object to feed back a roughness haptic sense to the user,
    wherein the predicting of the virtual object comprises:
        predicting a region of interest of the user based on a gaze direction of the user; and
        predicting the virtual object comprising the region of interest to be a virtual object most likely to collide with the hand.

2. The method of claim 1, wherein the feeding back of the roughness haptic sense comprises:
    rotating or moving an end effector of the haptic sense providing device in contact with the hand according to the surface roughness of the predicted virtual object and a moving direction of the hand to perform haptic sense rendering for feeding back the roughness haptic sense.

3. The method of claim 2, wherein, for the end effector, polygonal or elliptical shaped protrusions in which an X-axis radius is different from a radius of another axis are formed, or a textured surface on which the protrusions are formed is attached, so that different roughness haptic senses are fed back to the user according to an angle in which the end effector is in contact with the hand.

4. The method of claim 1, wherein the predicting of the virtual object comprises:
    predicting a position and time at which the hand collides with the predicted virtual object based on a position and moving velocity of the hand; and
    moving a position of the end effector that makes contact with the hand in the haptic sense providing device and feeds back the roughness haptic sense to the user according to the predicted position and time.

5. A system for providing a roughness of a virtual object, the system comprising:
    an HMD for displaying virtual objects to a user;

a virtual object roughness providing device for tracking a position of a hand of the user and predicting a virtual object most likely to collide with the hand among the virtual objects; and a haptic sense providing device for feeding back a roughness haptic sense to the user according to a surface roughness of the predicted virtual object, in response to the hand contacting the haptic sense providing device, wherein the virtual object roughness providing device predicts a region of interest of the user based on a gaze direction of the user, and predicts a virtual object including the region of interest to be a virtual object most likely to collide with the hand.

6. The system of claim 5, wherein the virtual object roughness providing device rotates or moves an end effector of the haptic sense providing device in contact with the hand according to the surface roughness of the predicted virtual object and a moving direction of the hand to perform haptic sense rendering for feeding back the roughness haptic sense.

7. The system of claim 6, wherein, for the end effector, polygonal or elliptical shaped protrusions in which an X-axis radius is different from a radius of another axis are formed, or a textured surface on which the protrusions are formed is attached, so that different roughness haptic senses are fed back to the user according to an angle in which the end effector is in contact with the hand.

8. The system of claim 5, wherein the virtual object roughness providing device predicts a position and time at which the hand collides with the predicted virtual object based on a position and moving velocity of the hand, and according to the predicted position and time, moves a position of the end effector that contacts the hand in the haptic sense providing device and feeds back the roughness haptic sense to the user.

9. A virtual object roughness providing device, the device comprising:

a visual rendering unit for displaying virtual objects to a user using an HMD;

a user tracker for tracking a position of a hand of the user;

an object prediction unit for predicting a virtual object most likely to collide with the hand among the virtual objects; and a haptic sense rendering unit for, in response to the hand contacting a haptic sense providing device, controlling the haptic sense providing device according to a surface roughness of the predicted virtual object to feed back a roughness haptic sense to the user, wherein the object prediction unit predicts a region of interest of the user based on a gaze direction of the user, and predicts a virtual object including the region of interest to be a virtual object most likely to collide with the hand.

10. The device of claim 9, wherein the haptic sense rendering unit rotates or moves an end effector of the haptic sense providing device in contact with the hand according to the surface roughness of the predicted virtual object and a moving direction of the hand to perform haptic sense rendering for feeding back the roughness haptic sense.

11. The device of claim 9, wherein the object prediction unit predicts a position and time at which the hand collides with the predicted virtual object based on a position and moving velocity of the hand, and the haptic sense rendering unit moves a position of the end effector that contacts the hand in the haptic sense providing device and feeds back the roughness haptic sense to the user according to the predicted position and time.

* * * * *